US006206704B1

(12) United States Patent
Tsai

(10) Patent No.: US 6,206,704 B1
(45) **Date of Patent: *Mar. 27, 2001**

(54) KARAOKE NETWORK SYSTEM WITH COMMERCIAL MESSAGE SELECTION SYSTEM

(75) Inventor: Tom Jen Tsai, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/227,612

(22) Filed: Jan. 8, 1999

Related U.S. Application Data

(63) Continuation of application No. 08/645,910, filed on May 14, 1996, now Pat. No. 5,947,746.

(30) Foreign Application Priority Data

May 23, 1995 (JP) .................................................. 7-124056

(51) Int. Cl.[7] .............................. G09B 5/00; G09B 15/04

(52) U.S. Cl. ................................ 434/307 A; 434/307 R; 434/365; 84/609; 348/563; 360/72.2; 463/29

(58) Field of Search ................................ 434/307 R–309, 434/318, 365; 84/477 R, 601–615, 625, 630–638, 645; 369/2, 4, 22, 32, 34, 48, 50, 83, 178, 192; 360/1.9, 33.1, 32, 49, 69, 70, 72.1, 72.2, 77.01, 98.04, 137; 381/81, 82, 119; 463/29, 40, 43; 348/563, 564, 569, 571, 906; 345/339, 348–356; 455/4.2, 5.1, 6.3

(56) References Cited

U.S. PATENT DOCUMENTS 5,247,126 9/1993 Okamura et al. .
5,488,409 1/1996 Yuen et al. .
5,489,103 2/1996 Okamoto .
5,532,754 7/1996 Young et al. .
5,594,509 1/1997 Florin et al. .
5,613,909 3/1997 Stelovsky .
5,619,249 4/1997 Billock et al. .
5,644,355 7/1997 Koz et al. .
5,726,702 3/1998 Hamaguchi et al. .
5,749,735 5/1998 Redford et al. .

FOREIGN PATENT DOCUMENTS 4128798 4/1992 (JP) .
4131987 5/1992 (JP) .
5188980 7/1993 (JP) .
6318090 11/1994 (JP) .

OTHER PUBLICATIONS

Kobe Port Captain, vol. 2, No. 1, Nov. 1, 1987, pp. 65–66.

Multimedia Dictionary, NTT Data Communications Corporation, Public Relations Department, Dec. 1, 1994, pp. 55–57.

Macromedia Director 4.0 Technical Manual [Studio Technique] Mizuki Corporation, Feb. 25, 1995, pp. 4–283.

*Primary Examiner*—Joe H. Cheng
(74) *Attorney, Agent, or Firm*—Pillsbury Winthrop LLP

(57) ABSTRACT

An improved karaoke network system that allows a user to select and obtain desired information through an interface while a message is displayed between intermissions of karaoke performances. Data files for karaoke performance, displaying messages, and displaying data selection menus are written in a common structure. Each of the data files includes an action region that contains link data. The data files are associated with one another by the link data contained in the action regions of the data files. A chain of related data files are executed by a menu selection operation or a key input operation by the user for performing karaoke performance and displaying messages and data selection menus.

9 Claims, 7 Drawing Sheets

| | | |
|---|---|---|
| TE | Text | TE |
| IE | Icon Graphic | IE |
| GE | Monitor Image Graphic | GE |
| AE | Action upon Selection<br><br>(Example)<br>Song Performance (Karaoke Song Information)<br>Execution of another data file (Display)<br>Transfer Control to another data file | AE |

KARAOKE NETWORK SYSTEM WITH COMMERCIAL MESSAGE SELECTION SYSTEM

This is a continuation of application Ser. No. 08/645,910, filed May 14, 1996, now U.S. Pat. No. 5,947,746.

BACKGROUND OF THE INVENTION

1. Field of the Invention

Embodiments of the present invention relate to a karaoke network system that is capable of displaying commercial messages during an intermission period between karaoke performances.

2. Description of Related Art

Karaoke network systems have become very popular. A typical karaoke network system includes a host computer installed in a central station and, typically, a plurality of karaoke stations, each of which is installed in a business establishment, such as, for example, a bar, a club and the like. Each of the karaoke stations is connected to the host computer via a communication line that supplies karaoke song performance data from the host computer to the karaoke station.

In recent years, karaoke network systems that are capable of presenting commercial messages have also become popular. According to this karaoke network. systems, data for commercial messages is supplied from the central station and reproduced during intermission periods between karaoke song performances. The commercial messages provide the users with a variety of information including information about new songs.

In conventional karaoke network systems capable of presenting commercial messages, the commercial messages are displayed according to pre-programmed presentation data, and an individual user cannot select information types that suites the interest and the needs of the user. Even when the user desires to obtain more detailed information about a particular commercial message that is being displayed, the conventional karaoke network systems do not respond to the users desire.

SUMMARY OF THE INVENTION

It is an object of the present invention to provide a karaoke network system in which an operator can select and obtain detailed information about a particular commercial message that is displayed between karaoke performances.

In accordance with an embodiment of the present invention, a karaoke network system includes a host computer and a plurality of karaoke stations connected to the host computer through a communication line.

The host computer includes a first memory device that stores a group of data files and a transmission device that transmits the group of data files stored in the first memory device to each of the karaoke stations. Each of the data files is written in a common file format and contains link data representative of linking relations with other of the data files and menu data for selection of the data files. The linking relations are defined by input values. Each of the data files also includes at least one of karaoke performance data and image data for representing information.

The karaoke station includes a reception device that receives the group of the data files supplied by the host computer. A second memory device stores the group of data files received by the reception device. A reading device reads a designated data file from the group of data files stored in the second memory device. An interpretation device interprets contents of the designated data file read out by the reading device, and outputs information contained in the designated data file to a circuit or a unit based on the types of information. A karaoke performance device synthesizes a musical sound based on the karaoke performance data supplied by the reading device, mixes the synthesized musical sound with a vocal sound inputted from a microphone to generate a mixed sound. A display device operates to display information to an operator and gives directions for a menu selection operation based on the image data for presenting the information and the menu data for selecting information, respectively, supplied by the reading device. An input device outputs an input value in response to the menu selection operation or a music designation operation performed by the operator. A designating device designates a next data file to be read out by the reading device based on the input value supplied by the input device and linking data contained in the data file that is read out by the interpretation device. By the menu selection operation or the song designation operation by the operator, a chain of data files is executed so that information contained in the chain of data files is presented or the karaoke performance is performed.

In accordance with another embodiment of the present invention, a karaoke network system includes a host computer and a plurality of karaoke stations connected to the host computer through a communication line.

The host computer includes a first memory device that stores a plurality of data files. Each of the data files contains time management data representative of linking relations with other of the data files, and at least one of karaoke performance data and moving image data for presenting a moving image. The linking relations are determined by time slots of divided time durations for displaying the moving images. A transmission device transmits a group of the data files stored in the first memory device to each of the karaoke stations.

Each of the karaoke stations includes a reception device that receives the group of the data files supplied by the host computer, a second memory device that stores the group of the data files received by the reception device, and a reading device that reads out a designated data file from the group of the data files from the second memory device. An interpretation device interprets contents of the data file read out by the reading device, and outputs information contained in the data file to a destination circuit or a device associated with the type of the information. A karaoke performance device synthesizes a musical sound based on the karaoke performance data supplied by the reading device, mixes the synthesized musical sound with a vocal sound inputted from a microphone to form a mixed sound, and outputs the mixed sound. A display device displays information to an operator based on the moving image data for presenting a moving image supplied by the reading device. A timer device measures time duration for displaying the moving image data by the display device. An input device generates a signal in response to an input operation by the operator. A designating device determines one of the time slots defined by the time management data supplied by the reading device that is associated with the signal generated by the input device based on the time duration measured by the timer device, and designates a next data file to be read out by the reading device based on the time slot determined by the designating device. By the input operation of the operator, a next data file associated with the data being displayed in the display device is executed, and data contained in the next data file is presented by the display device. For example, when the operator selects a menu item relating to song introduction information that is displayed in the display device, a data file associated with the selected menu item containing data for the song introduction information is executed, and karaoke performance of the song is performed.

Other features and advantages of the invention will be apparent from the following detailed description, taken in conjunction with the accompanying drawings which illustrate, by way of example, various features of embodiments of the invention

BRIEF DESCRIPTION OF THE DRAWINGS

A detailed description of embodiments of the invention will be made with reference to the accompanying drawings.

DETAILED DESCRIPTION OF EMBODIMENTS

Embodiments of the present invention will be described below with reference to the accompanying drawings.

Figure 1:
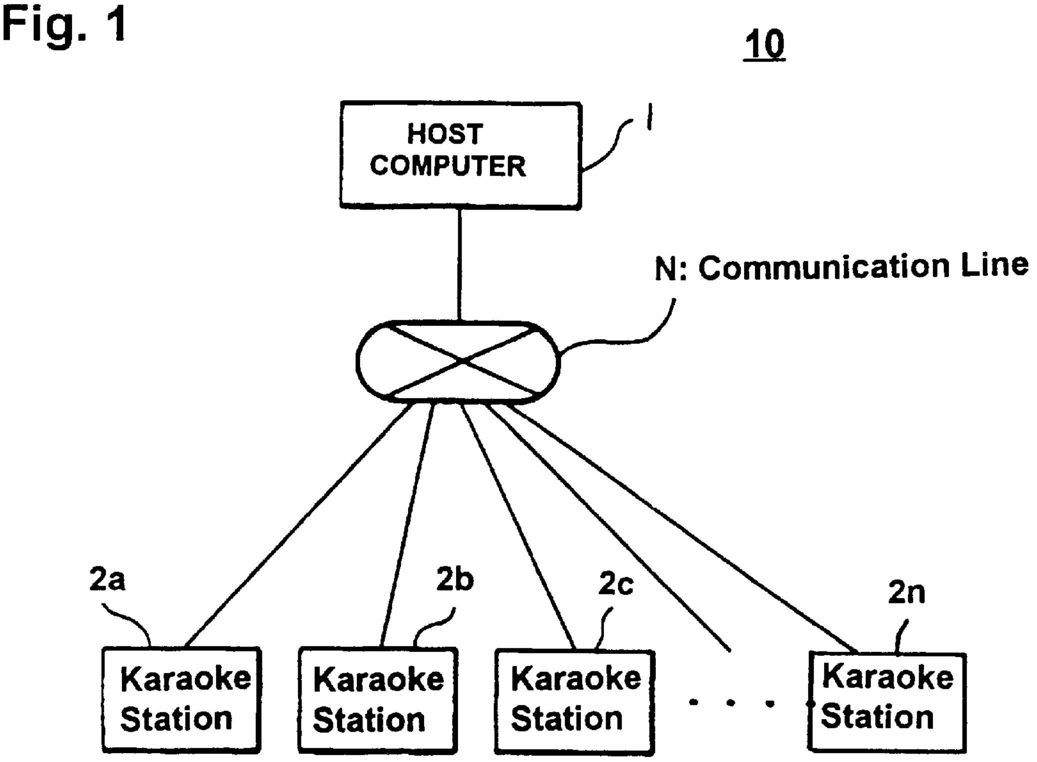
FIG. 1 shows a block diagram of a karaoke network system in accordance with an embodiment of the present invention.

FIG. 1 shows a block diagram of a karaoke network system 10 in accordance with an embodiment of the present invention. As shown in FIG. 1, the karaoke network system 10 includes a host computer 1 that is connected to a plurality of karaoke stations $\mathbf{2}_a$, $\mathbf{2}_b$, $\mathbf{2}_c$, . . . $\mathbf{2}_n$ via a communication line N. The host computer 1 transfers groups of data files containing various information (that are described later) to each of the karaoke stations $\mathbf{2}_a$, $\mathbf{2}_b$, $\mathbf{2}_c$, . . . $\mathbf{2}_n$. The groups of data files may be transferred periodically or at any time as required. Each of the karaoke stations $\mathbf{2}_a$, $\mathbf{2}_b$, $\mathbf{2}_c$, . . . $\mathbf{2}_n$ executes designated data files containing various information, and provides the information to users at each of the karaoke stations $\mathbf{2}_a$, $\mathbf{2}_b$, $\mathbf{2}_c$, . . . $\mathbf{2}_n$. As described later in more detail, in one embodiment, the user selects desired data files through a manmachine dialogue interface.

Figures 2, 3:
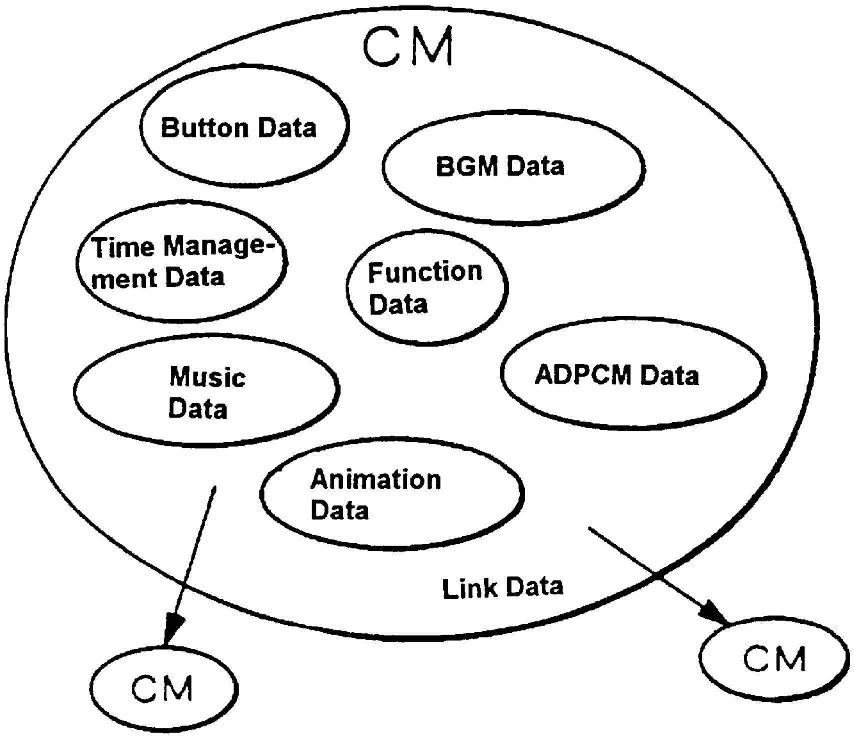
FIG. 2 schematically shows a group of data files containing various data in accordance with an embodiment of the present invention.
FIG. 3 shows a format of a data file in accordance with an embodiment of the present invention.

FIG. 2 schematically shows a group of data files containing a variety of data in accordance with an embodiment of the present invention. As shown in FIG. 2, the group of data files contains music data including song lyrics data for displaying lyrics of songs, and animation data for displaying commercial messages (CM) in the form of moving pictures or video pictures in a display monitor 35 (see FIGS. 5 and 6(*a*)). The group of data files also contains ADPCM data for adding sounds to the commercial messages, back ground music data (both in the form of MIDI data) required for performing pieces of back ground music that are played while various images are displayed, and performance data (in the form of MIDI data) required for karaoke performance (not shown). The group of data files further contains function data representative of operation contents of each of the data files, button data for displaying icon images in the display monitor 35, link data for determining mutual relationships of the data files, and time management data. The time management data will be described later in more detail.

In accordance with an embodiment of the present invention, the group of data files that includes the above-described data is executed to perform various operations, such as karaoke performance, commercial message presentation, presentation of data selection menus and the like. In accordance with an embodiment of the present invention, each data file in the group of data files is all written in a common data format (or data structure), for example, shown in FIG. 3.

Referring to FIG. 3, each of the data files has a text region TE, an icon graphic image region IE, a display graphic image region GE, and an action region AE. The text region TE of each data file includes text data for indication of a title of the data file, the icon graphic image region IE contains image data for displaying icons in the display monitor 35, the display graphic image region GE contains image data for displaying pictures and photos to be displayed in the display device upon selection of the data file, and the action region AE contains process data that is executed upon the selection of the data file.

For example, when a data file relates to a karaoke song, the text region TE contains data for a title of the karaoke song, and the icon graphic image region IE normally does not contain any data. The display graphic image region GE contains image data for graphically displaying the title of the karaoke song, and the action region AE contains MIDI data required for synthesizing sounds for musical performance and song lyrics data required for displaying lyrics of the karaoke song during the karaoke performance.

In another embodiment, when a data file relates to an information selection menu, the text region TE contains data for a tile to be displayed in an image of the information selection menu, and the icon graphic image region IE contains image data for icons that are used for selecting menu items presented in the image of the information selection menu and other various input operations. The display graphic region GE contains image data for pictures and photos, and the action region AE contains data for the menu items to be displayed, data for information to be displayed, and data for background music to be performed, as well as data for interpreting a variety of input operations including menu selection operation.

Figure 4:
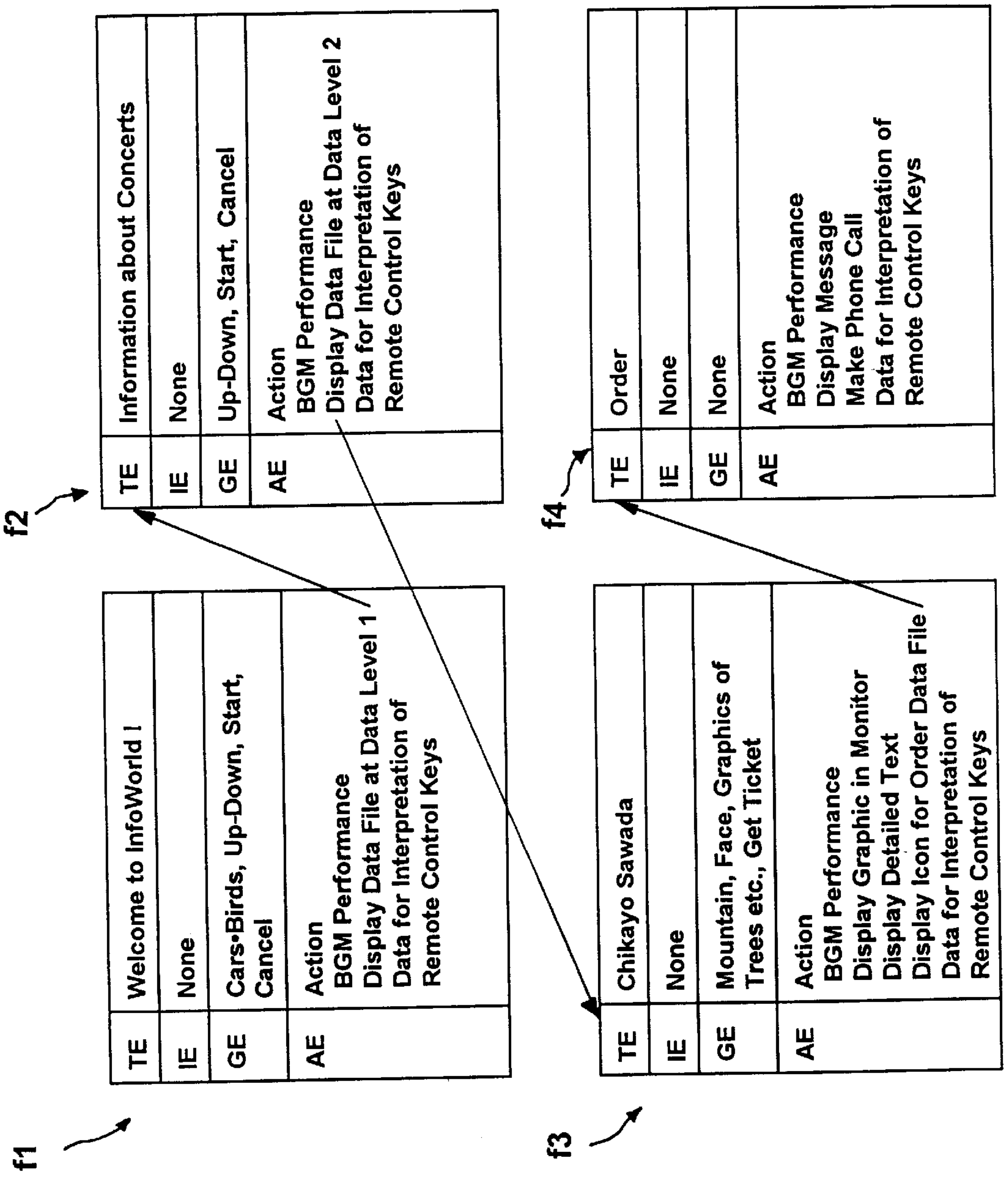
FIG. 4 shows a link structure for data files in accordance with an embodiment of the present invention.
Figure 5:
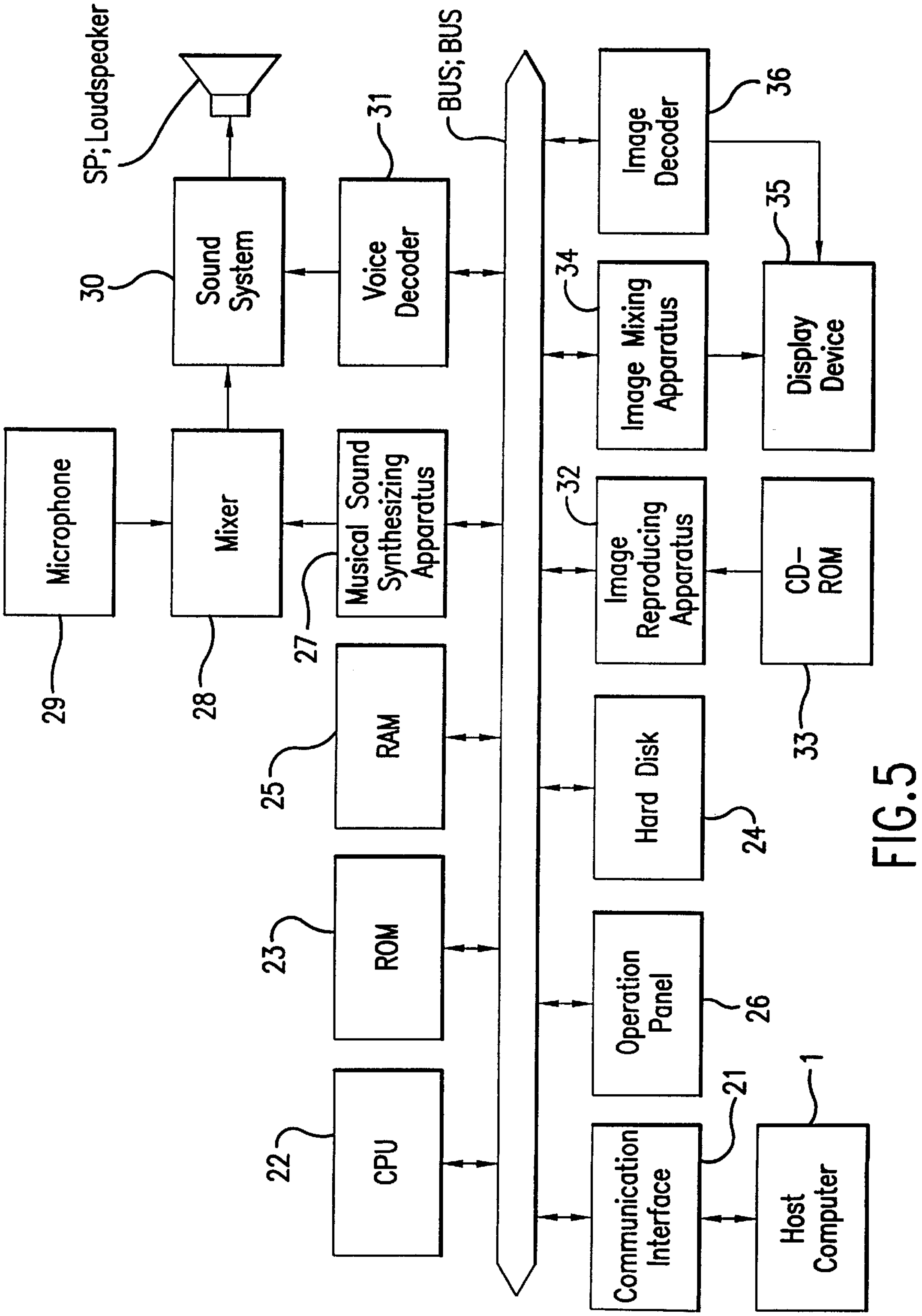
FIG. 5 shows a block diagram of a karaoke station in accordance with an embodiment of the present invention.
Figure 6A:
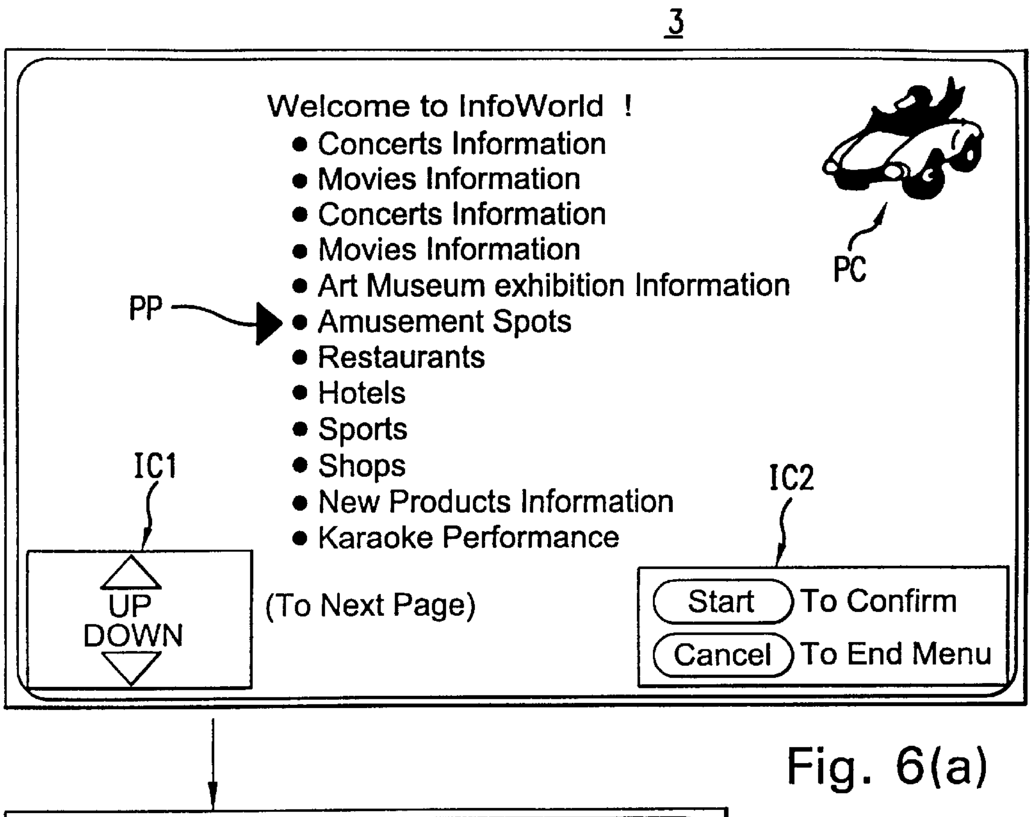
FIG. 6 shows images that are linked and successively displayed in a display device in accordance with an embodiment of the present invention.
Figure 6B:
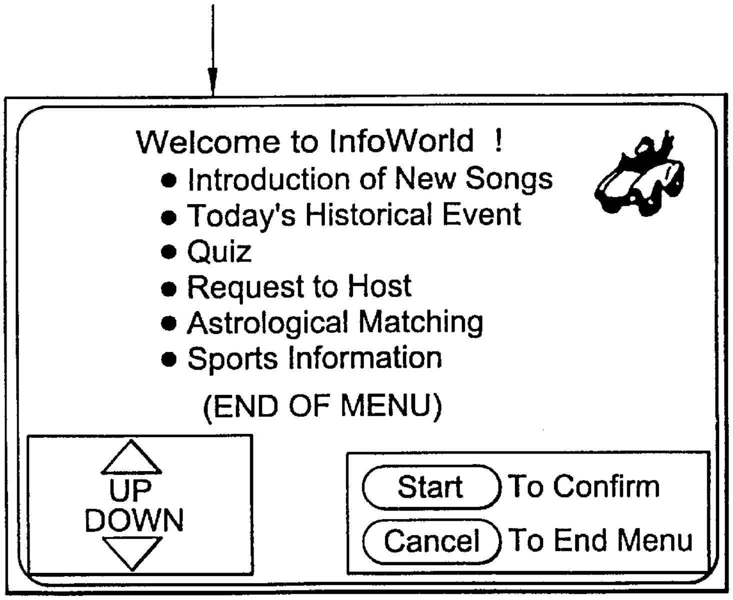

In accordance with an embodiment of the present invention, a plurality of data files, including those files described above, are mutually linked to one another by data that is contained in the action region AE of each of the data files. In a preferred embodiment, the plurality of data files are mutually linked to one another in a hierarchical manner by data that is contained in the action region AE of each of the data files. For example, a data file relating to an information selection menu is linked to a plurality of other data files by a linking structure such as shown in FIG. 4. More specifically, in a preferred embodiment, a data file f1 for a main menu 3 (see FIG. 6(*a*)) contains, in its action region AE, main menu execution data for displaying titles (in the form of texts or icons) in the main menu 3 (namely, a menu at data level 1), in a specified order at specified locations in a display monitor 35, for example, as shown in FIGS. 5 and 6(*a*).

Figure 7A:
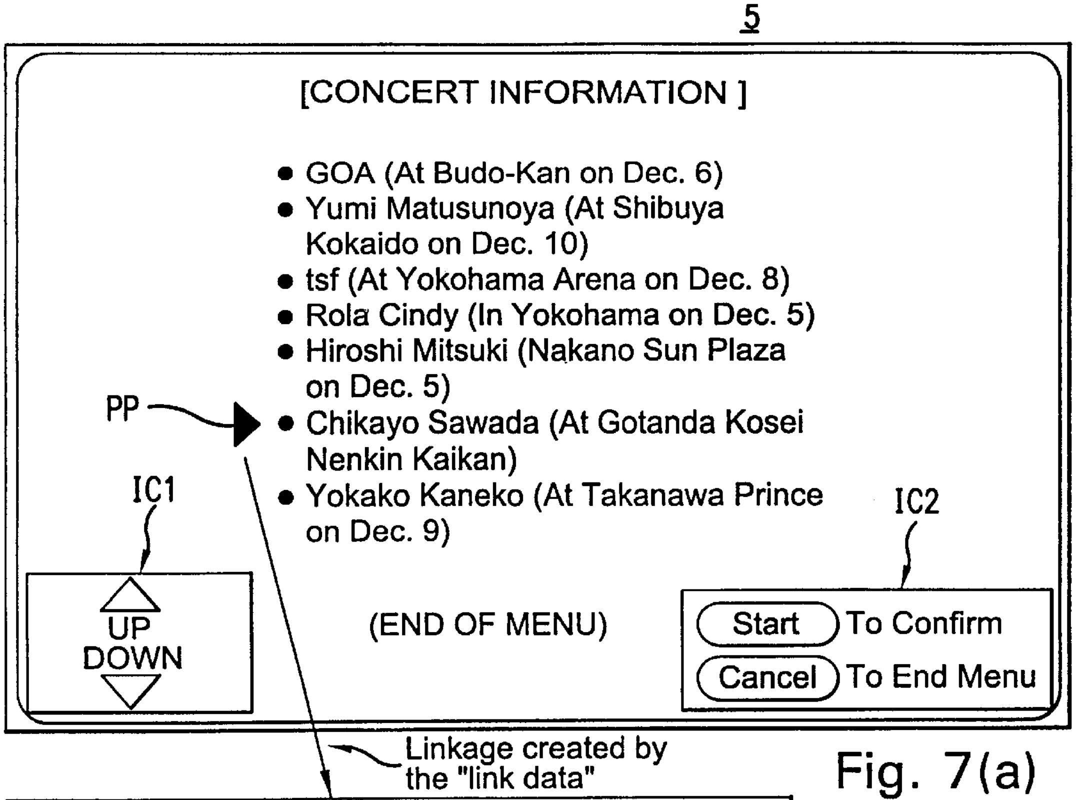
FIG. 7 shows additional images that are linked and successively displayed in a display device in accordance with an embodiment of the present invention.
Figure 7B:
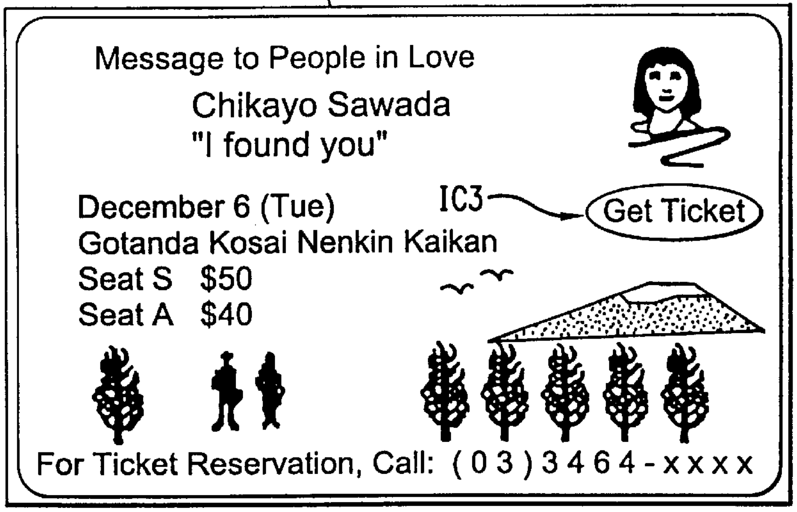

For example, when a title of Information about concerts is selected from the main menu 3, a data file f2 associated with the title of Information about concerts is executed. The data file f2 contains, in its action region AE, execution data for displaying titles, that define a sub-menu 5 (see FIG. 7(*a*)) relating to concerts (namely, a menu of data level 2), in a specified order at specified locations, for example, as shown in FIG. 7(*a*).

For example, when a title for an artist/singer "Chikayo Sawada" is selected from the sub-menu 5, a data file f3 associated with the title for "Chikayo Sawada" is executed. The data file f3 contains, in its action region AE, data for displaying an order icon 6 (see FIG. 7(*b*)) that is used for accepting an order for a ticket for the concert by "Chikayo Sawada" and data indicative of a data file that is executed when the order is placed.

When the order icon 6 is selected by depressing the order icon 6 in the display monitor 35 to order the ticket, a data file f4 associated with the order of the ticket for the concert by "Chikayo Sawada" is executed. The data file f4 contains, in its action region AE, data for inquiring of the host computer 1 for the ticket reservation status, and data representative of processes for requesting a reservation of the ticket and the like.

Since the data files f1, f2, f3 and f4 are linked to one another in the manner described above, information is provided to the operator through a man-machine dialogue interface, that is described later.

Referring to FIG. 5, a structure of the karaoke station 2 is described.

In FIG. 5, a communication interface 21, such as, for example, a modem, an ISDN (Integrated Services Digital Network), and the like, is connected to the host computer 1 through the communication line N. A CPU (central processing unit) 22 executes a system program that is stored in a ROM (read only memory) 23. The CPU is connected to a bus BUS, and controls various apparatus units that are connected to the bus BUS. Also, the CPU 22 executes the data files described above to perform karaoke performances and display information, such as commercial message pictures.

A hard disk 24 stores data files supplied from the host computer 1. A RAM (readable and writable memory) 25 is used as a work area for the CPU 22.

An operation panel 26 has various key switches (start key, stop key, cancel key, up-down key, ten-key and the like) (not shown). The operation panel 26 detects an operation of key depression of the various key switches by an operator, and supplies signals in response to the key depression operation to the CPU 22. By the operation panel 26, a karaoke performance is designated and a variety of information is selected. For example, by using the ten-key at the operation panel 26 to input numbers associated with the karaoke song, a karaoke song is selected. Performance of the karaoke song is started or stopped by the start key or the stop key, and loudness of the karaoke performance is adjusted by the up-down key or the like. Furthermore, by using the ten-key, the up-down key, or the like at the operation panel 26, information about menu items displayed in a display device 35 (hereinafter referred to as a display monitor 35) can be obtained.

A musical sound synthesizing apparatus 27 generates a musical sound signal corresponding to the MIDI data (which is performance data for a karaoke song or a background music included in a data file) that is successively supplied by the CPU 22. The musical sound synthesizing apparatus 27 then outputs the musical sound signal to a mixer 28. The mixer 28 mixes the musical sound signal that is supplied from the musical sound synthesizing apparatus 27 and a vocal signal that is picked up by a microphone 29 to form a mixed signal, and outputs the mixed signal to a sound system 30. In the case of the performance of a piece of background music, the mixer 28 directly outputs the musical sound signal supplied from the musical sound synthesizing apparatus 27 to the sound system 30.

A voice decoder 31 converts ADPCM data that is read out from a data file by the CPU 22 into an analog sound signal, and outputs the analog sound signal to the sound system 30. The sound system 30 amplifies the musical sound signal that is supplied from the mixer 28 and/or the analog sound signal that is supplied from the voice decoder 31. The sound system 30 then outputs the amplified signal through a loud speaker SP.

An image reproducing apparatus 32 reads out, from a CD-ROM 33, image data for a background image associated with a data file for a karaoke song that is selected to be reproduced. The image reproducing apparatus 32 then transfers the image data to an image mixing apparatus 34. The image mixing apparatus 34 mixes the image data that is supplied from the image reproducing apparatus 32 and font data (which is stored in the image mixing apparatus 34) corresponding to lyrics of the karaoke song that is read out from the data file for the karaoke song by the CPU 22 to form a mixed image data. The display monitor 35 displays images corresponding to the mixed image data.

The CPU 22 also reads out, from data files, moving picture data for a moving picture for a commercial message and compressed image data (image data in the form of MPEG, JPEG or the like) for still images used as menus and icons, and supplies the moving picture data and the compressed image data to an image decoder 36.

The image decoder 36 decompresses and converts the moving picture data and the compressed image data into analog image signals that are displayed by the display monitor 35.

An operation of the karaoke network system 10 having the above-described structure will be described below with reference to FIGS. 6(*a*), 6(*b*), 7(*a*), 7(*b*), 8 and 9.

The description is mainly focused on an operation of the karaoke station 2, assuming that data files have already been supplied from the host computer 1 to the karaoke station 2.

When the karaoke station 2 is powered on, the CPU 22 loads and executes a system program stored in the ROM 23. After an initial setting procedure is completed, the CPU 22 reads out a data file f1 for a main menu from a group of data files stored in the hard disc 24 and executes the data file f1.

As a result, an image of a main menu shown in FIG. 6(*a*) is displayed on the display monitor 35. For example, based on title data contained in the text region TE of the data file f1, a title of the main menu, "Welcome to Infoworld!", is displayed. Based on a title display program contained in the action region AE, texts for data files at the data level 1 are displayed. More specifically, the display monitor 35 displays titles of the data files in the form of texts corresponding to a variety of information, such as, Information about Concerts, Information about Movies, Information about Stage shows and the like. In alternative embodiments, the titles of the data files may be presented in the form of icons or the like. The action region AE of the data file f1 contains a program for drawing elements at specified locations that become a part of the main menu image. Based on image data contained in the image graphic region GE, icons IC1 and IC2 for instructing the operation for selecting menu items from the main menu and a picture PC are displayed as shown in FIG. 6(*a*).

Based on instructions by the icons IC1 and IC2, an operator may press an up key or a down key (not shown) provided in the operation panel 26 to move up or down a pointer PP (a cursor) displayed in the display monitor 35 for selecting a menu item from the main menu. By depressing a start key provided on the operation panel, the selected menu item is confirmed. By depressing a cancel key provided on the operation panel, the execution of the data file f1 is stopped. When the entire image of the main menu cannot be shown in the display monitor 35 and only a part of the main menu is shown in the display monitor 35, the main image is scrolled as shown in FIG. 6(*b*) to display another part of the main menu.

When the pointer PP is placed on a menu item of Information about Concerts shown in the main menu image and the start key is depressed, a data file f2 (see FIG. 4) associated with the selected menu item, "Information about Concerts", is executed because the data file f2 is linked to the data file f1 based on link data contained in the action region AE of the data file f1. The link data defines relationships between results of selection of song titles (or menu items) displayed based on the data file f1 and data files associated with the titles to be executed upon selection of the titles.

As a result, texts for menu items and the title of "Concerts Information" are read out, and an image of a second menu including the texts and the title is displayed on the display monitor 35 as shown in FIG. 7(*a*). For example, based on title data contained in the text region TE of the data file f2, the title of the second menu, "Information about Concerts" is displayed. Further, based on a title display program contained in the action region AE of the data file f2, the texts at data level 2 are displayed on the display monitor 35. In this embodiment, the texts are composed of names of artists, for example, "GOA", "Yumi Matsunoya", "tsf" and the like who have scheduled concerts. The icons IC1 and IC2 for instructing menu selection operation and the pointer PP are also displayed in a similar manner as shown in the main menu in FIG. 6(*a*).

For example, when the pointer PP is placed on a menu item "Chikayo Sawada" shown in the menu image and the start key is depressed, a data file f3 (see FIG. 4) for information about concerts by "Chikayo Sawada" is executed because the data file f3 is linked to the data file f2 based on link data contained in the action region AE of the data file f2. As a result, an image containing a commercial message for the information about concerts by "Chikayo Sawada" shown in FIG. 7(*b*) is displayed on the display monitor 35. Namely, based on title data contained in the text region TE of the data file f3, the name of the singer/artist "Chikayo Sawada" is displayed. Also, based on image data contained in the image graphic region GE of the data file f3, the display monitor 35 displays a photo or an illustration of the singer/artist "Chikayo Sawada", and an icon IC3 for receiving an order for tickets for a concert by "Chikayo Sawada". Furthermore, based on text data contained in the action region AE, detailed information about the scheduled concert is displayed.

For example, when a reservation designating key, that is defined by a start key or the like provided on the operation panel 26, is depressed, a data file f4 (see FIG. 4) relating to ticket reservation for the concerts of "Chikayo Sawada" is executed as the data file f4 is linked to the data file f3 based on link data contained in the action region AE of the data file f3. As a result, the karaoke station 2 requests the host computer 1, that manages the ticket reservation for the concerts, to inquire about the reservation status and automatically process the reservation procedure. The host computer 1 returns reservation result data, and the display monitor 35 displays a message representative of the reservation result data, informing the operator of whether or not the reservation has been made.

By selecting menu items from the menus through a man-machine interactive type interface having a hierarchical structure, an operator can obtain desired information about specified concerts in the manner described above. Also, the operator can make a reservation for tickets.

When a menu item of Information about New Products is selected from the main menu described above (see FIG. 6(*a*)), a group of files relating to the selected menu item is executed in the following manner.

As the menu item of Information about New Products is selected from the main menu shown in FIG. 6(*a*), a data file containing text data for a text of Information about New Products is executed based on link data contained in the data file f1, and a sub-menu of product groups (not shown) is displayed. It is noted that, when the text of Information about New Products is displayed in the display monitor 35, the link data is stored in a predetermined memory area by the menu program.

For example, the sub-menu may include titles for product groups, such as, for example, "Cars", "Videos", "Cameras" and the like. When the title "Cars" is selected, a car data file containing data for commercial messages for new model cars is executed. In a preferred embodiment, the data contained in the car data file associated with the title "Cars" may contain image data for still pictures, moving pictures, video clips or the like.

Figure 8:
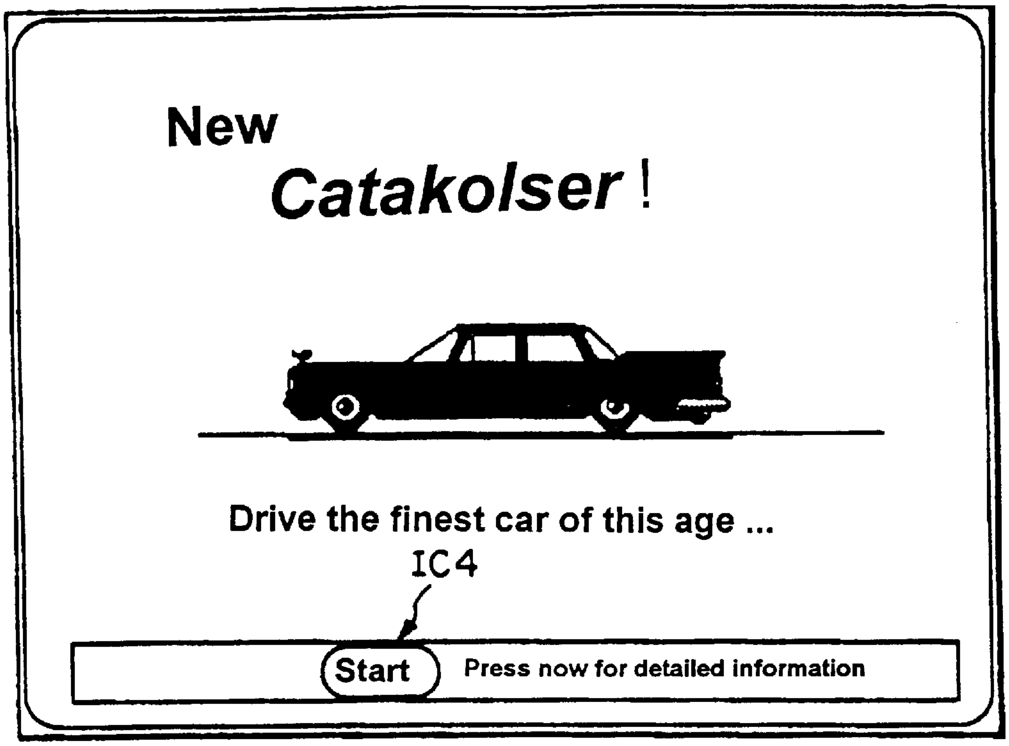
FIG. 8 shows an image representative of data for introducing new products that is displayed in a display device in accordance with an embodiment of the present invention.

The data contained in the car data file associated with the title "Cars" is successively supplied to the image decoder 36, and a commercial message for introducing a new modeled car (or cars) is displayed by the display monitor 35, as shown in FIG. 8. During the display, an icon IC4 is also displayed by the display monitor 35. The icon IC4, in this case, represents a start key for starting the execution of a detail car data file containing more detailed information about the new modeled car. When the operator depresses the start key on the operation panel 26 while the new model car is shown in the display monitor 35, the detail car data file containing more detailed information about the new model car that is being shown in the display monitor 35 is executed, and a commercial message is displayed to provide more detailed information about the new model car. The commercial message may contain texts, moving picture images, still picture images, video clips, and the like.

In alternative embodiments of the present invention, the title "Cars" may be associated with a plurality of new model cars so that, when the title "Cars" is selected, a commercial message containing information about the plurality of new modeled cars is presented. When the start key on the operation panel 26 is depressed when a specified one of the plurality of new model cars is displayed in the display monitor 35, a data file associated with the specified one of the plurality of new model cars is executed. In one embodiment, the display time for the commercial message is divided into a specified number of time slots (namely, time ranges) so that each of the cars is introduced one after another in the commercial message for a unit of the time slot. On the other hand, an icon defining a start key is normally displayed in the display monitor 35. In an embodiment, different icon images may be used for different cars. In order to associate the start key depression operation with each of the new model cars, a data file associated with the title "Cars" contains, in its action region AE, time management data (see FIG. 2) for defining relationships between the time slots of the commercial message display time and other data files respectively containing detailed information about the different new modeled cars.

Data for a specified new model car may be retrieved from the corresponding one of the data files according to a variety of methods. For example, in accordance with an embodiment of the present invention, a timer (not shown), such as, for example, a software timer, is provided to count the time for displaying the commercial message from the start of the commercial message until the start key is depressed, and provides a count value corresponding to the measured time. The CPU 22 detects one of the times slots corresponding to the timing of depression of the start key based on the count value provided by the timer. The CPU 22 then executes a data file containing detailed information of the specified new model car that is associated with the time slot. As a result, the detailed information about the new model car, that is displayed when the start key is depressed, is provided.

Next, description will be made for a case when a menu item "Karaoke Performance" is selected from the above-described main menu 3 shown in FIG. 6(*a*). In this case, the menu item "Karaoke Performance" is linked to a data file containing data for "Karaoke Performance" (not shown) based on link data contained in the data file f1. By selecting the menu item "Karaoke Performance" from the main menu 3, the data file containing data for "Karaoke Performance" is executed. For example, the data file for "Karaoke Performance" contains data for presenting a song selection menu. In this case, the song selection menu is displayed in the display monitor 35 as the menu title "Karaoke Performance" shown in FIG. 6(*a*) is depressed.

In a preferred embodiment, for example, a number or alphanumeric characters for a song may be inputted to select the song, using the keys provided on the operation panel 26 when the song selection menu image is displayed in the display monitor 35. In response to the input of the number or the alphanumeric characters, a karaoke data file containing data for performing the selected song is executed based on link data contained in the action region AE of the data file containing data for "Karaoke Performance".

The CPU 22 successively interprets data contained in the action region AE of the karaoke data file. The data contained in the action region AE of the karaoke data file includes at least MIDI data for the song, character data for lyrics for the selected song and a code for background image. The CPU 22 supplies the MIDI data to the musical sound synthesizing apparatus 27 to generate a musical sound signal, and the character data for lyrics for the selected song to the image mixing apparatus 34. Also, the CPU 22 supplies the code for background image to the image reproducing apparatus 32. Based on the code for background image, image data corresponding to the code is read out from the CD-ROM 33 and supplied to the image mixing apparatus 34.

The musical sound signal generated by the musical sound synthesizing apparatus 27 and a vocal sound signal inputted from the microphone 29 are mixed together by the mixer 28, and outputted from the loud speaker SP. On the other hand, the image data and the character data for the song lyrics are mixed by the image mixing apparatus 34 to generate a display image. The display image is displayed by the display monitor 35 in synchronism with the progress of the selected song.

Figure 9:
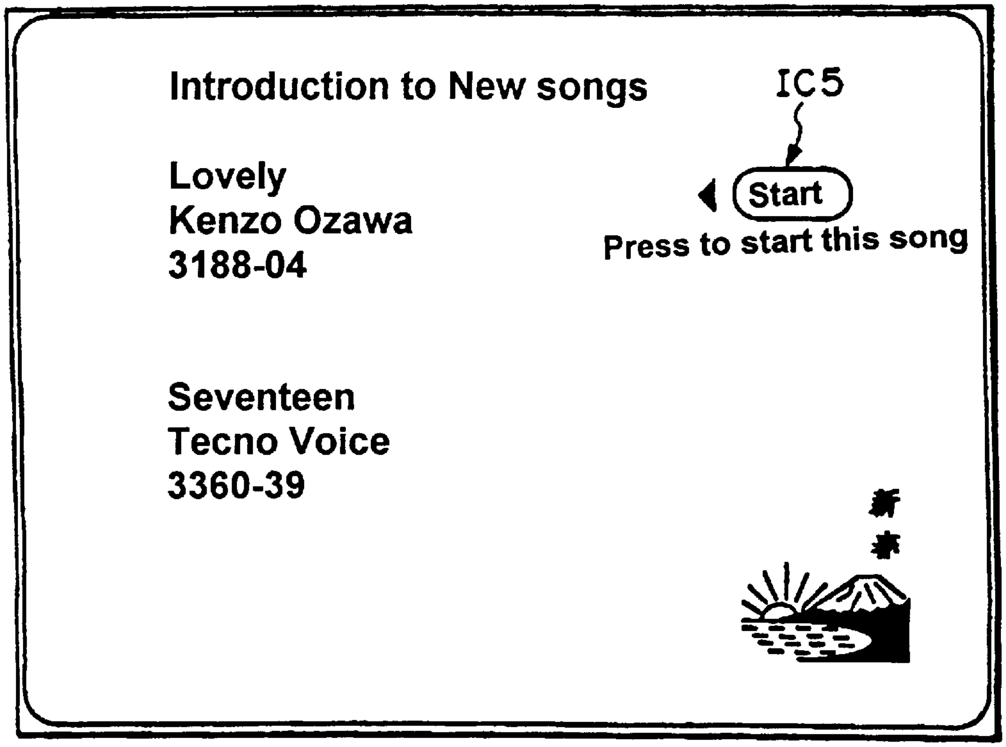
FIG. 9 shows an image representative of data for introducing new songs that is displayed in a display device in accordance with an embodiment of the present invention.

Next, when a menu item "Introduction of New Songs" shown in FIG. 6(*b*) is selected, a chain of data files are executed in the following manner. When the menu item "Introduction of New Songs" shown in FIG. 6(*b*) is selected, a data file (not shown) containing data including text data for introducing new songs is executed based on link data contained in the data file for the main menu that is displayed. By this selection, an image for introducing new songs is displayed on the display monitor 35, as shown in FIG. 9.

In the image for introducing new songs, in accordance with an embodiment of the present invention, for example, text information containing titles of new songs, names of artists, and numbers of the new songs is presented. The text information may be vertically scrolled to successively introduce the new songs. At the same time, an icon IC5 defining a start key for starting a specified new song, a title of the displayed image for introducing new songs, images including, for example, pictures and photos, and the like are displayed at specified locations in the display monitor 35.

When the operator depresses the start key on the operation panel 26 when a title text for a specified new song moves next to the start key icon IC5, a new song data file for the specified new song, that is displayed on the left-hand side of the start key icon, is executed, and a karaoke performance for the specified new song is performed.

The data file for introducing new songs contains, in its action region AE, time management data (see FIG. 2). The time management data defines relationships between time slots of the display time for a plurality of new song titles and other data files respectively containing data for the new songs, in a similar manner in the case of "Introduction of New Songs" described above.

The CPU 22 detects one of the time slots corresponding to the timing of depression of the start key provided on the operation panel 26 based on a value counted by a timer, and executes a new song data file that is associated with the time slot based on the time management data. As a result, a karaoke performance for the new song, that is displayed on the left side of the start key icon when the start key is depressed, is performed. The operation for the karaoke performance for the new song is substantially the same as that for the karaoke performance for other songs as described above, and thus the detailed description of the operation is omitted.

When another menu item is selected from the above-described main menu image (see FIGS. 6(*a*) and 6(*b*)), a data file corresponding to the selected menu item is executed, and information is displayed through the dialogue type interface between the operator and the displayed information in the display monitor 35, in a similar manner as described above in connection with the selection of the menu items of Information about New Products, Information about Concerts, and so forth.

A variety of interface methods can be used as a man-machine type interface. In accordance with the embodiments describe above, a cursor is moved to select menu items through a key input operation at the operation panel 26. However, menu items shown in the display monitor may be selected by a pointing device, such as, for example, a mouse and the like. Alternatively, a touch sensitive screen may be used so that a user can select menu items by touching the screen.

Furthermore, the menu structure is not limited to the embodiments described above. In the above embodiments, the menu item "Karaoke Performance" is included in the main menu. However, in alternative embodiments, the main menu may be formed from two menus for "Karaoke Performance" and "Information". Also, in the above-described embodiments, menu items are mainly displayed in texts representative of associated data files. However, the menu items can be displayed by icons or the like.

As described above, in accordance with embodiments of the present invention, a chain of data files is executed through the menu selection operation or the song designation operation by an operator through a dialogue type interface between the operator and a displayed image. As a result, a network karaoke system performs karaoke songs, and provides specified information for items presented during intermissions between karaoke performances that are selected by the user.

Also, a data file contains data for a moving picture, and is associated with data being displayed in a display device. For example, the moving picture may contain information for a variety of items. When the data file is executed by a data selection operation or an input operation by an operator, the moving picture of the data file is displayed in the display device. The data file is further associated with a plurality of data files containing detailed information respectively corresponding to the variety of items. As a result, in accordance with an embodiment of the present invention, information for any one of the items can be selected and obtained by the user while the moving picture is displayed in the display device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A karaoke system coupled to a host computer through a communication line, comprising:

(a) a memory that stores a plurality of files of commercial message data in a hierarchical structure, wherein each file of the commercial message data contains at least:
  (a-1) display data to be shown to a user, and
  (a-2) link data defining linking relations with other files of commercial message data to be shown to the user upon the user's selection, wherein each of the linking relations are associated with an input value inputted by the user; and (b) a transmission device that communicates the plurality of commercial message data to the host computer in an order determined by the link data and the input value inputted by the user.

2. The karaoke system according to claim 1, wherein the display data comprises at least one of text data and image data.

3. The karaoke system according to claim 2, wherein the image data is moving picture data.

4. The karaoke system according to claim 1, wherein the display data represents other files of commercial message data.

5. A karaoke system comprising:

(a) a selector operated by a user of the karaoke system;

(b) a memory that stores a plurality of files of commercial message data in a hierarchical structure, wherein each file of the commercial message data contains at least:
  (a-1) display data to be shown to a user, and
  (a-2) link data defining linking relations with other files of commercial message data to be shown to the user upon the user's selection through the selector, wherein each of the linking relations are associated with an input value inputted by the user through the selector; and (c) a read-out device that reads out commercial message data from the memory.

6. The karaoke system according to claim 5, further comprising a display for displaying an image associated with the display data and the link data.

7. The karaoke system according to claim 6, wherein the display proceeds based on the selection of the commercial message data selected by the user through the selector.

8. The karaoke system according to claim 6, wherein the selector is an icon displayed on the display.

9. The karaoke system according to claim 5, wherein the display data represents other files of commercial message data.

* * * * *